United States Patent [19]
Sonoda et al.

[11] Patent Number: 5,820,300
[45] Date of Patent: Oct. 13, 1998

[54] $CO_2$ SEA BOTTOM THROW-AWAY SYSTEM

[75] Inventors: Keisuke Sonoda; Masahiko Ozaki; Yuichi Fujioka; Osamu Tsukamoto, all of Nagasaki, Japan

[73] Assignee: Mitsubishi Jukogyo Kabushiki Kaisha, Tokyo, Japan

[21] Appl. No.: 583,663

[22] Filed: Jan. 5, 1996

[30] Foreign Application Priority Data

Feb. 21, 1995 [JP] Japan ................................. 7-056728

[51] Int. Cl.⁶ .......................... B63C 11/00; F17C 1/00
[52] U.S. Cl. .................. 405/188; 62/53.1; 405/128; 405/191; 405/210; 588/250
[58] Field of Search ................. 405/52–59, 210, 405/128, 188–192; 62/53.1

[56] References Cited

U.S. PATENT DOCUMENTS

| 5,293,751 | 3/1994 | Asai | 405/210 X |
| 5,364,611 | 11/1994 | Iijima et al. | 62/53.1 X |

FOREIGN PATENT DOCUMENTS

| 0 408 979 | 1/1991 | European Pat. Off. | |
| 2-133308 | 5/1990 | Japan . | |
| 3-69508 | 3/1991 | Japan . | |
| 404055681 A | 2/1992 | Japan | 62/53.1 |
| 405038429 A | 2/1993 | Japan | 62/53.1 |

Primary Examiner—Dennis L. Taylor
Attorney, Agent, or Firm—Wenderoth, Lind & Ponack, L.L.P.

[57] ABSTRACT

A $CO_2$ deep sea throw-away system includes a floating offshore base (2), receiving liquefied $CO_2$ carried by a liquefied $CO_2$ carrier (1). The base has a throwing pipe (3) and a throwing pipe outlet (4) to deliver the liquified $CO_2$ in an enclosing bag (11) in the sea at a depth where a liquid phase state of the liquified CO is maintained. An unmanned submersible working boat (10) is provided and has a plurality of capsules (26) mounted thereon. Each capsule contains an enclosing bag (11) to enclose the liquefied $CO_2$. The boat transports the capsules into the sea at a depth where a liquid phase state of the liquefied $CO_2$ is maintained and operates to enclose the liquefied $CO_2$ in the enclosing bags (11). The liquified $CO_2$ in the enclosing bag (11) and the capsule (26) are then released so as to fall onto the sea bottom. Also, a control base (9) is provided on the offshore sea to control the unmanned submersible working boat (10).

10 Claims, 8 Drawing Sheets

$CO_2$ SEA BOTTOM THROW-AWAY SYSTEM

BACKGROUND OF THE INVENTION

1. Field of the Invention

The present invention relates to a sea bottom throw-away system or mass disposal system for carbon dioxide (herein referred to as "$CO_2$"), considered to cause global warming.

2. Description of the Prior Art

Presently offshore disposal (isolation) technology for $CO_2$ is under research and development so that there is no practical method in use. One of the most practical systems, however, will be one where $CO_2$ recovered from a $CO_2$ mass generation source, such as a thermal power station, etc., is liquified and thrown into the deep sea to a depth of 3500 meters or more to be stored on the deep sea bottom.

One previously contemplated system is shown as a conceptual drawing in FIG. 9. $CO_2$ recovered from a thermal power station is liquified and transported to an offshore base 02 by a liquified $CO_2$ carrier 01. Liquified $CO_2$ 06 is then thrown away into the deep sea through a throwing pipe 03, which hangs down from the offshore base 02 into the sea. The throwing pipe has an outlet 04, which is set in the deep sea at a depth of 3500 meters or more, where density of the liquified $CO_2$ becomes larger than the sea water density generally because of the influence of the water pressure. Thus the liquified $CO_2$ 06 thrown from the throwing pipe 03 falls and forms a natural sedimentation on the sea bottom 05 by the force of gravity. However, in this system, when sedimentation of the liquified $CO_2$ 06 occurs, a part of the liquified $CO_2$ 06 melts in the sea water 07 and changes the pH value of the sea water 07. There is thus a fear that unfavorable influences may affect the deep sea environment and ecosystem.

Further, by the liquified $CO_2$ 08 stored on the deep sea bottom 05 and melting in the sea water 07, it is considered that more than a small change in the deep sea environment may occur over a long period of time.

SUMMARY OF THE INVENTION

In view of the circumstances as mentioned above, it is an object of the present invention to provide a sea bottom throw-away system and equipment which can prevent unfavorable influences on the deep sea environment and the deep sea bottom environment.

A liquified $CO_2$ sea bottom throw-away system according a first object of the present invention comprises an offshore base floating on the offshore sea. It receives liquified $CO_2$ carried by a liquified $CO_2$ carrier, and has a throwing pipe and a throwing pipe outlet. The liquified $CO_2$ is enclosed in a bag in the sea at a depth where the liquid phase state of the liquified $CO_2$ will be maintained. An unmanned submersible working boat has a plurality of capsules, which each contains a bag for the liquified $CO_2$. The boat transports the capsules into the sea to the depth where the liquid phase state of the liquified $CO_2$ is maintained and is used to enclose the liquified $CO_2$ in the bag at that depth. The boat then lets the liquified $CO_2$, together with the bag and the capsule, fall onto the sea bottom. A control base located on the offshore sea controls the unmanned submersible working boat.

The unmanned submersible working boat according to a second aspect of the invention, is connected to the submersible working boat control base by a communication cable. The boat has an intake that is to be connected to the liquified $CO_2$ throwing pipe outlet of the offshore base, and comprises a moving device for moving the boat in a vertical direction and in a horizontal direction. Also, the boat includes a plurality of capsules each containing an enclosing bag for enclosing the liquified $CO_2$. The $CO_2$ flows from the intake through a distribution piping into the bag. Each bag is able to be thrown off from the boat.

The bag for enclosing liquified $CO_2$ enclosing bag, according to a third aspect of the invention, is a bag contained in the capsule. It is a spherical bag made of a liquified $CO_2$ impervious sheet material, and comprises a valve at an upper portion thereof for closing the bag with the liquified $CO_2$ contained therein. An adjusting weight is fitted at a lower portion of the bag.

According to another aspect the invention, the submersible working boat has an intake to be connected to the liquified $CO_2$ throwing pipe outlet of the offshore base to throw away $CO_2$ onto the sea bottom. Piping transfers the liquified $CO_2$ taken from the intake. A containing portion contains the bag for enclosing the liquified $CO_2$ and the capsule.

According to a further aspect of the present invention, the submersible working boat has a sealing member (i.e. a hollow ring), a hydraulic control valve, a throwing pipe extreme end valve opening and closing device, and a bag separation device.

According to another aspect of the invention, the liquified $CO_2$ enclosing bag made of a liquified $CO_2$ impervious sheet material and comprising the valve and the weight are contained in the capsule.

The liquified $CO_2$ enclosing bag preferably has a rubber packing at a closing portion thereof.

According to the present invention constructed as above, the spherical bag having the liquified $CO_2$ therein, together with the capsule, becomes sedimentation. Even after it reaches the deep sea bottom, the liquified $CO_2$ is isolated from the sea water by the impervious material so that no liquified $CO_2$ melts into the sea water and, so that there is no change in the pH value of the sea water. Thus, there are no unfavorable influences from the liquified $CO_2$ on the deep sea water environment, and the deep sea bottom environment and the liquified $CO_2$ are permanently isolated from each other.

DETAILED DESCRIPTION OF THE PREFERRED EMBODIMENTS

Figure 1:
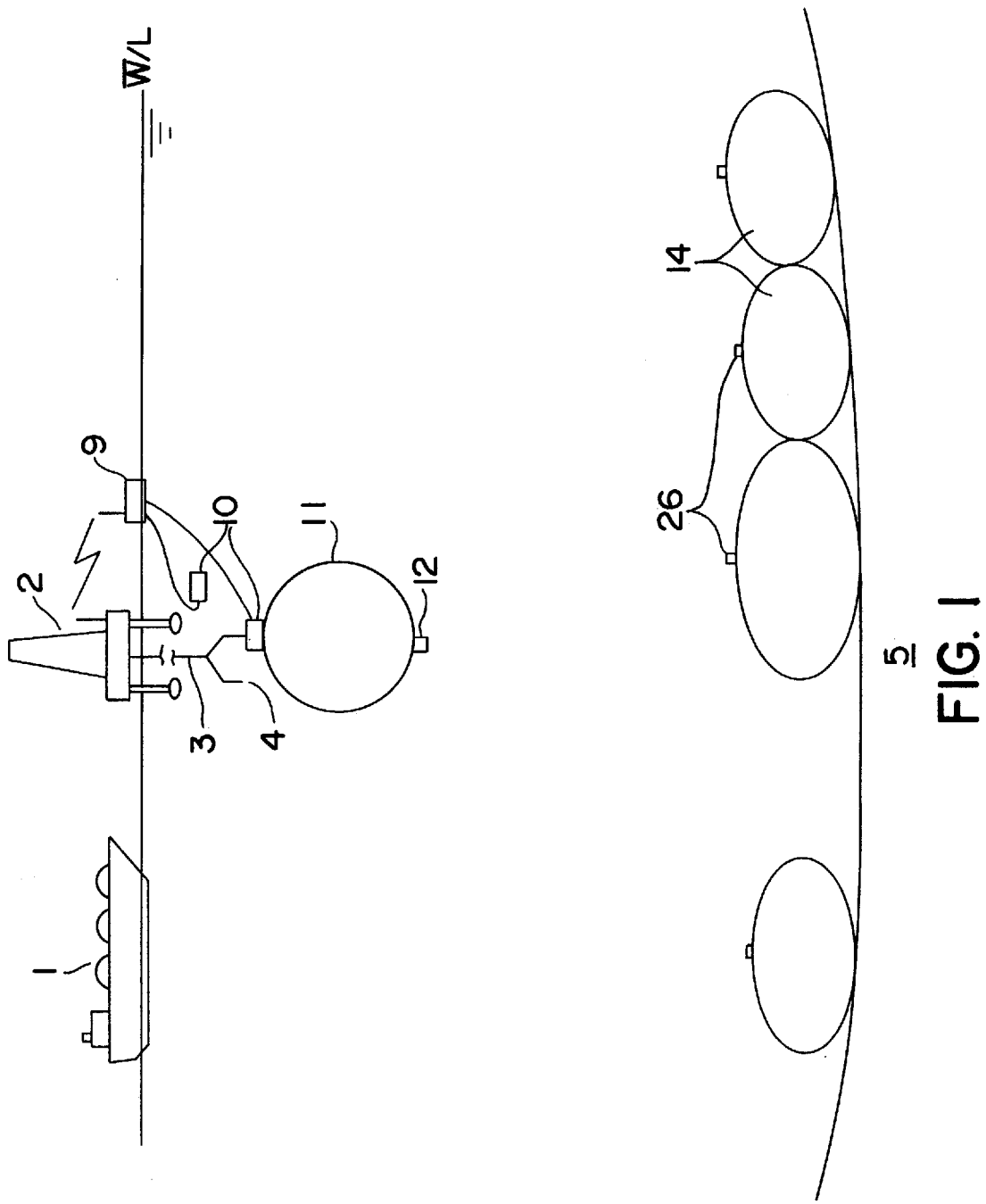
FIG. 1 is a conceptual drawing showing an entire system of one preferred embodiment according to the present invention.

Following is a description of one preferred embodiment according to the present invention. FIG. 1 is a conceptual drawing showing an entire system arranged in accordance with the present invention.

In FIG. 1, an offshore isolating system for $CO_2$ is composed of an offshore base 2 for receiving liquified $CO_2$. A throwing pipe 3, having a throwing pipe outlet 4, depends from the base 2 and is used for delivering the liquified $CO_2$ to a bag 11 in the sea at a depth where the liquid phase state of the liquified $CO_2$ will be maintained. An unmanned submersible working boat 10 has a plurality of capsules 26 mounted thereon, each containing a bag 11. The boat transports the capsules to the throwing pipe outlet 4. A control base 9 controls the unmanned submersible working boat 10.

$CO_2$ recovered from a mass generation source of $CO_2$ such as a thermal power station, etc., is first liquified and then transported to the offshore base 2 by a liquified $CO_2$ carrier 1. At the offshore base 2, the liquified $CO_2$ is supplied through the throwing pipe 3 to the unmanned submersible working boat 10 on which are the plurality of capsules 26 are mounted. Each capsule 26 contains a liquified $CO_2$ enclosing bag 11 which can be connected to the throwing pipe outlet 4. The bag 11 is spherical and made of a liquified $CO^2$ impervious material. The bag 11 is sealed by a closing valve 13 after a predetermined amount of the liquified $CO_2$ is enclosed therein, and is then separated from the unmanned submersible working boat 10.

Operations such as connection of the unmanned submersible working boat 10 to the throwing pipe outlet 4, filling the liquified $CO_2$ into the bag 11, separation of the bag 11 together with the capsule 26, etc. are remotely controlled through a communication cable 28 (FIG. 2), which is simultaneously a traction cable for emergency situations, from the offshore base 2 via a submersible working boat control base 9. The depth of the throwing pipe outlet 4 is set at a depth where $CO_2$ enters a liquid phase, for example about 40 atm, at a temperature of 0° C., or about 60 atm, at a temperature of 20° C.

The size of the liquified $CO_2$ enclosing bag 11 is considered appropriate if it is 50 m to 100 m in diameter. Incidentally, the density of liquified $CO_2$ is smaller than that of sea water at a depth of about 3500 meters or less and is larger than that of the sea water at a depth greater than about 3500 meters. Thus, considering that a buoyant force may act on the liquified $CO_2$ in the upper or lower vicinity of the depth where liquified $CO_2$ is filled into the bag 11, in order to sink the enclosing bag 11 together with the capsule 26 in the sea against the buoyant force, a weight 12, used to adjust the overall weight, is fitted at the lower end of the enclosing bag 11.

Figure 2:
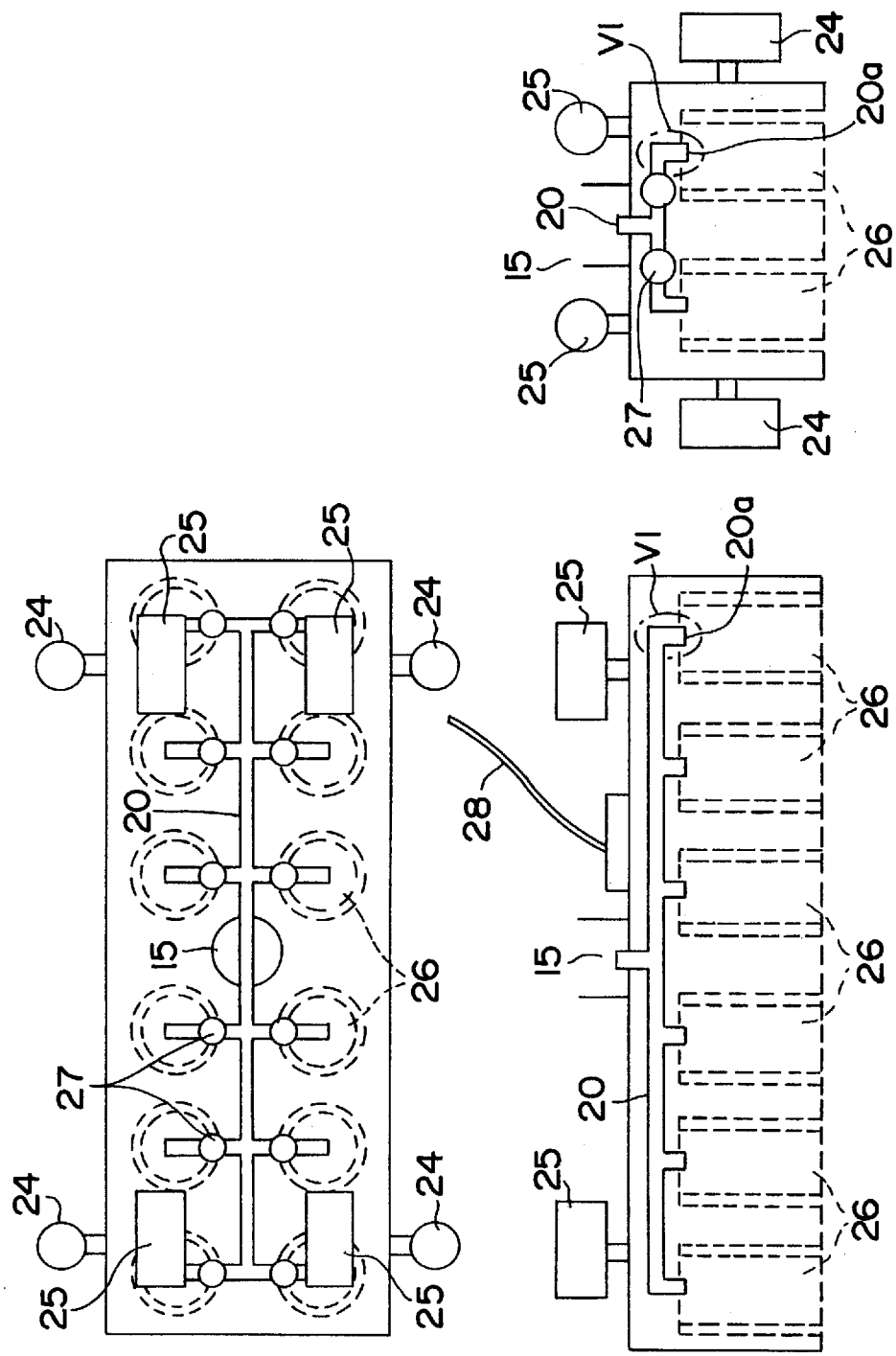
FIGS. 2A–2C are a plan view, a side view and a front view, respectively, showing an unmanned submersible working boat of FIG. 1.

In FIG. 2, the unmanned submersible working boat 10 holds twelve vertical cylindrical capsules 26 each containing a spherical bag 11 for enclosing liquified $CO_2$. The boat 10 is connected to the submersible working boat control base 9 by the cable 28. The submersible working boat 10 has a vertical direction propulsion device 24 and a horizontal direction propulsion device 25 mounted thereon for movement in the sea.

The unmanned submersible working boat 10 moving by the propulsion devices 24, 25, connects the throwing pipe outlet 4 and a liquified $CO_2$ intake 15 of the boat 10. The intake 15 is cylindrical. On its inner side is fitted a hollow ringshape rubber member 18 that can be expanded or contracted by supplying or withdrawing hydraulic oil. On its outer side a hydraulic control valve 16 is provided at two places. The hydraulic oil is supplied from the unmanned submersible working boat 10.

Figure 3:
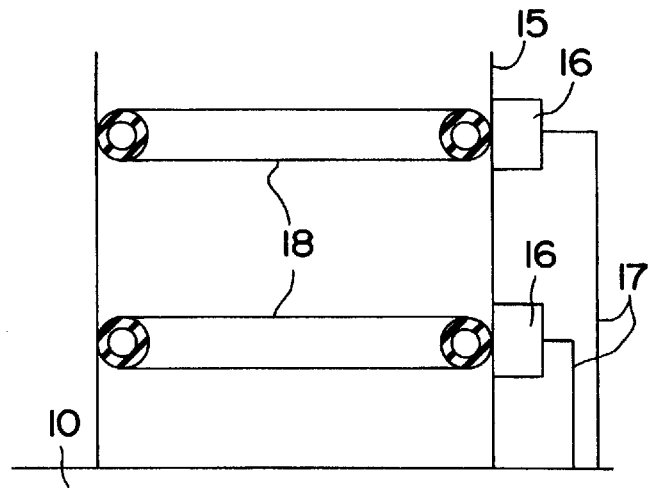
FIG. 3 is an enlarged longitudinal sectional view showing a liquified $CO^2$ intake of the submersible working boat of FIGS. 2A–2C.
Figure 4:
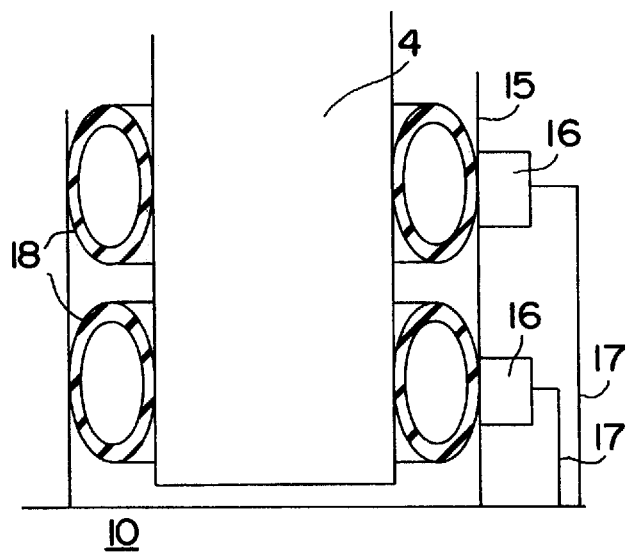
FIG. 4 is a longitudinal sectional view showing a state in which a lower end of a throwing pipe of an offshore base of FIG. 1 is inserted and fitted in a liquified $CO_2$ intake of the unmanned submersible working boat of FIG. 3.

At this time, the liquified $CO_2$ intake 15 is in a state, as shown in FIG. 3, such that the throwing pipe outlet 4 can be inserted. The pipe outlet is inserted and hydraulic oil is then supplied into the hollow ring-shape rubber member 18. Then, as shown in FIG. 4, the rubber member 18 is expanded and surrounds and holds the throwing pipe outlet 4 so that the throwing pipe outlet 4 and the liquified $CO_2$ intake 15 are sealingly connected.

Figure 5:
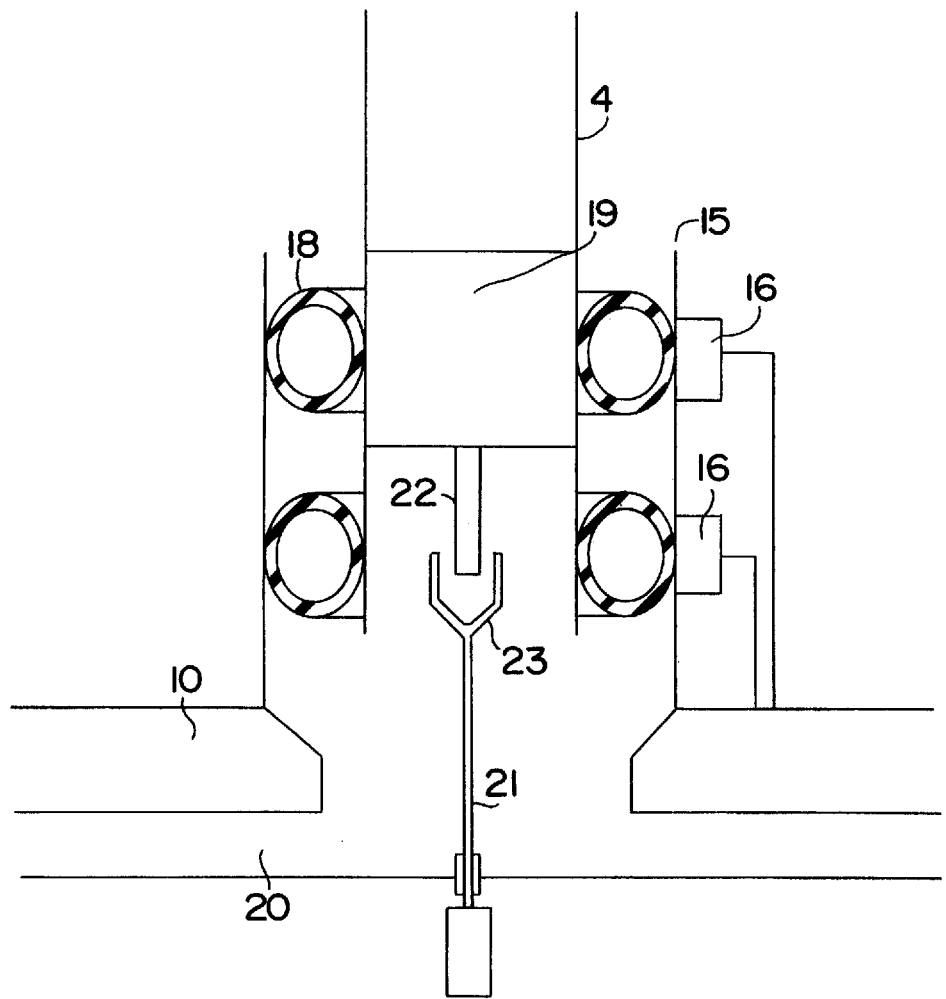
FIG. 5 is a detail view of FIG. 4.

FIG. 5 shows how to conduct the liquified $CO_2$ into the submersible working boat 10 from the throwing pipe 4. Where the throwing pipe outlet 4 and the liquified $CO_2$ intake 15 of the submersible working boat 10 are connected, an opening and closing shaft 22 of an extreme end valve 19 of the throwing pipe 3 and an extreme end valve opening and closing device 21 within the submersible working boat 10 are connected by a connecting device 23.

When the extreme end valve 19 is then opened, the liquified $CO_2$ flows into the submersible working boat 10. The liquified $CO_2$ flowing into the submersible working boat 10 is supplied into a capsule 26 through distribution piping 20 and is enclosed in the enclosing bag 11. The enclosing of the liquified $CO_2$ is controlled by a valve 27 (FIG. 2A–2C). Incidentally, the valve 27 is provided at each capsule 26. While the liquified $CO_2$ is being enclosed in a bag 11, only the corresponding valve 27 is open, and all other valves 27 are closed.

Figure 6:
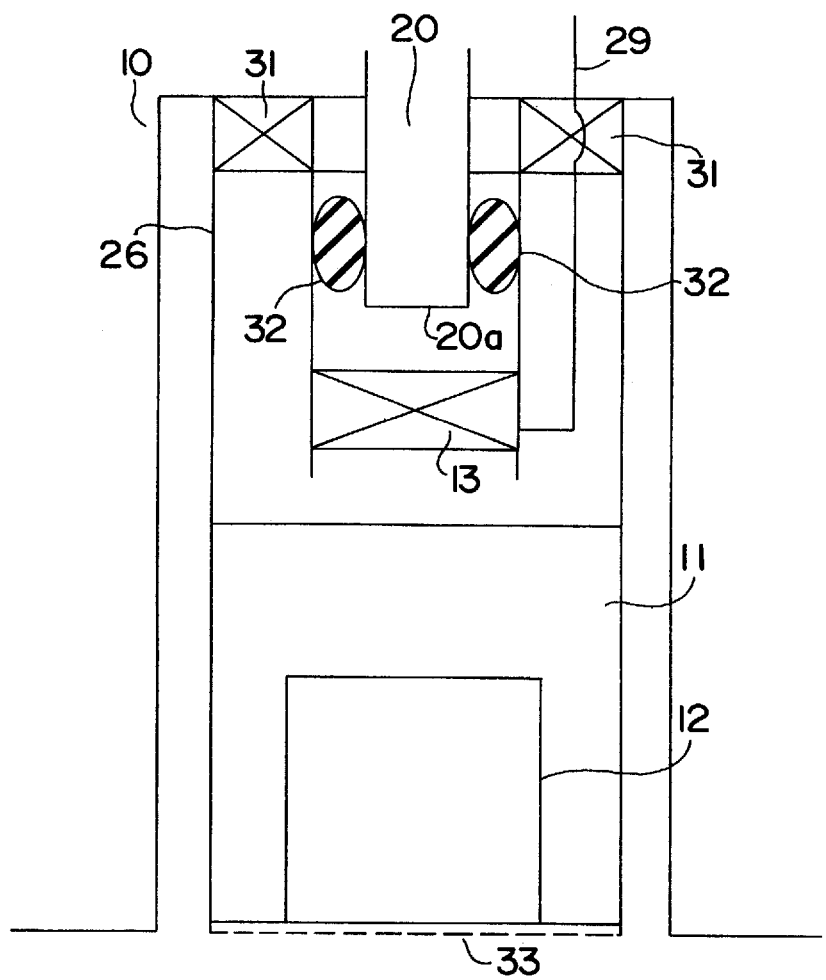
FIG. 6 is a longitudinal sectional view showing a distribution piping branch port and a capsule of a portion "VI" of FIG. 2.
Figure 7:
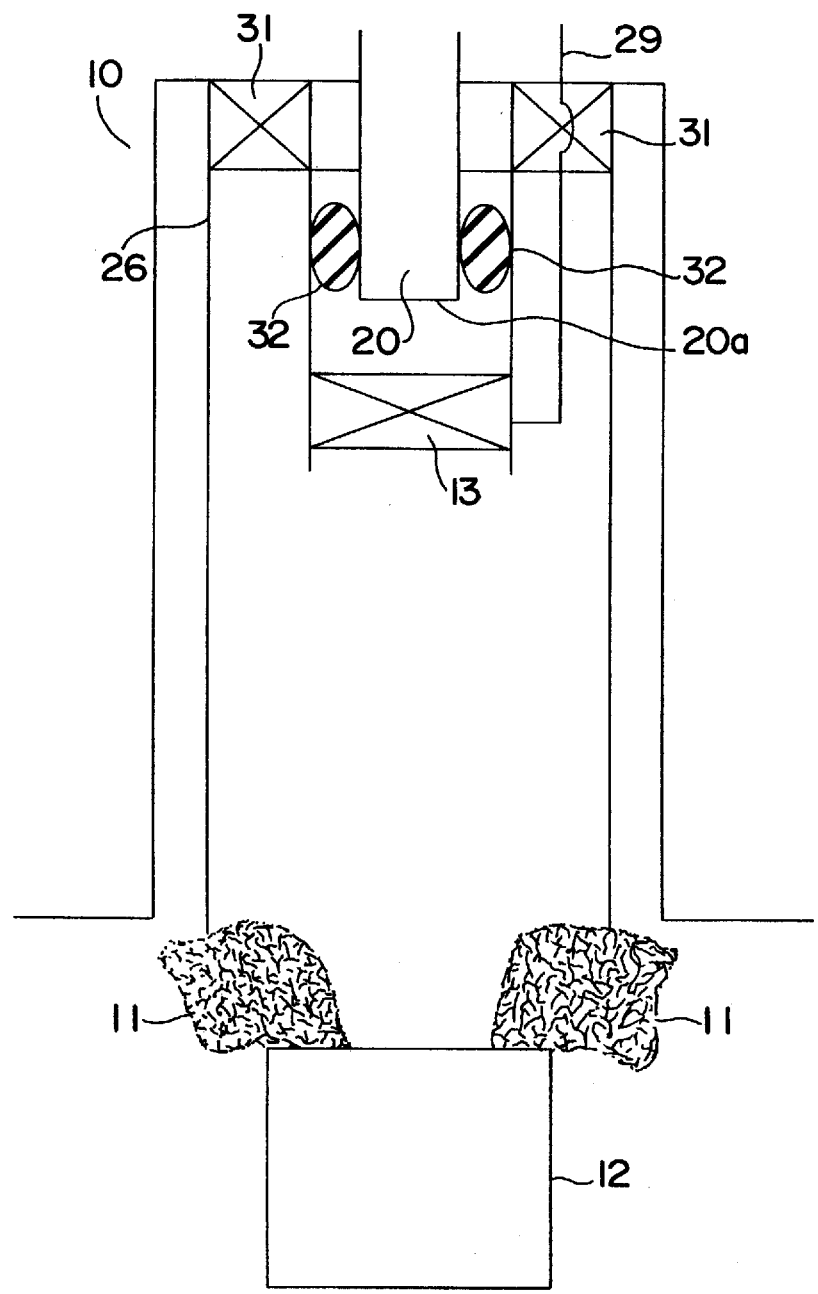
FIG. 7 is a longitudinal sectional view showing a state in which a bag, enclosing liquified $CO_2$ is let fall together with a capsule from a distribution pipe branch port of FIG. 6.

Further preferred features according to the present invention are described with reference to FIGS. 6 to 8. The spherical bag 11 is made of a liquified $CO_2$ impervious sheet material. A liquified $CO_2$ enclosing valve 13 is provided at the upper portion of the bag 11 and a weight adjusting weight 12 is provided at the lower portion of the bag 11.

The process of filing the liquified $CO_2$ into the enclosing bag 11 through the capsule 26 and separating the enclosing bag 11 having a predetermined amount of the liquified $CO_2$ therein are described with reference to FIG. 6, which shows a schematic view of the capsule 26. That is, the distribution piping 20 within the submersible working boat 10 and the capsule 26 are sealingly connected by a rubber packing 32. A bag separation device 31 for separating the bag 11 together with the capsule 26 from the boat 10 is provided on the submersible working boat 10 and connected to the capsule 26. The capsule enclosing valve 13 is provided at the capsule 26, and the bag 11 and the adjusting weight 12 are contained in the capsule 26.

When enclosing the liquified $CO_2$, the bag separation device 31 is first extended so as to break a partitioning break film 33. Thus the bag 11 and the adjusting weight 12 are discharged into the sea. At this time, the distribution piping 20 and the capsule 26 are sealingly connected.

The partitioning break film 33 has the function of holding the enclosing bag 11 and the weight adjusting weight 12 within the capsule 26 while liquified $CO_2$ is not filled into the bag. It is broken by the bag separation device 31 extending to a point where the enclosing bag 11 is not completely separated from the submersible working boat 10 during filling of the liquified $CO_2$ into the bag 11. The partitioning break film 33 is made of a sheet-like or mesh-like rubber, cloth or metal, etc., and is fitted to the submersible working boat 10 so as to cover the lower end opening portion of the capsule 26.

Then, the valve 13 and the valve 27 (FIG. 2) are opened and the liquified $CO_2$ flows into the enclosing bag 11. The state immediately after starting to fill the liquified $CO_2$ into the enclosing bag 11 is shown in FIG. 7.

Upon finishing filling a predetermined amount of the liquified $CO^2$ into the bag 11, the valve 13 and the valve 27 (FIG. 2) are closed. Then the bag separation device 31 is further extended and the liquified $CO_2$ enclosing bag 11, together with the capsule 26, is separated from the submersible working boat 10.

Incidentally, immediately before finishing the filling operation, preparation for the next filling operation (breaking of the partitioning break film 33 of the next capsule 26) is made. The valve 13 and the valve 27 for the capsule 26 finishing filling are closed, and the valve 13 and valve 27 for the next capsule to be filled are opened. Thus the filling of the liquified $CO_2$ is continuous.

Figure 8:
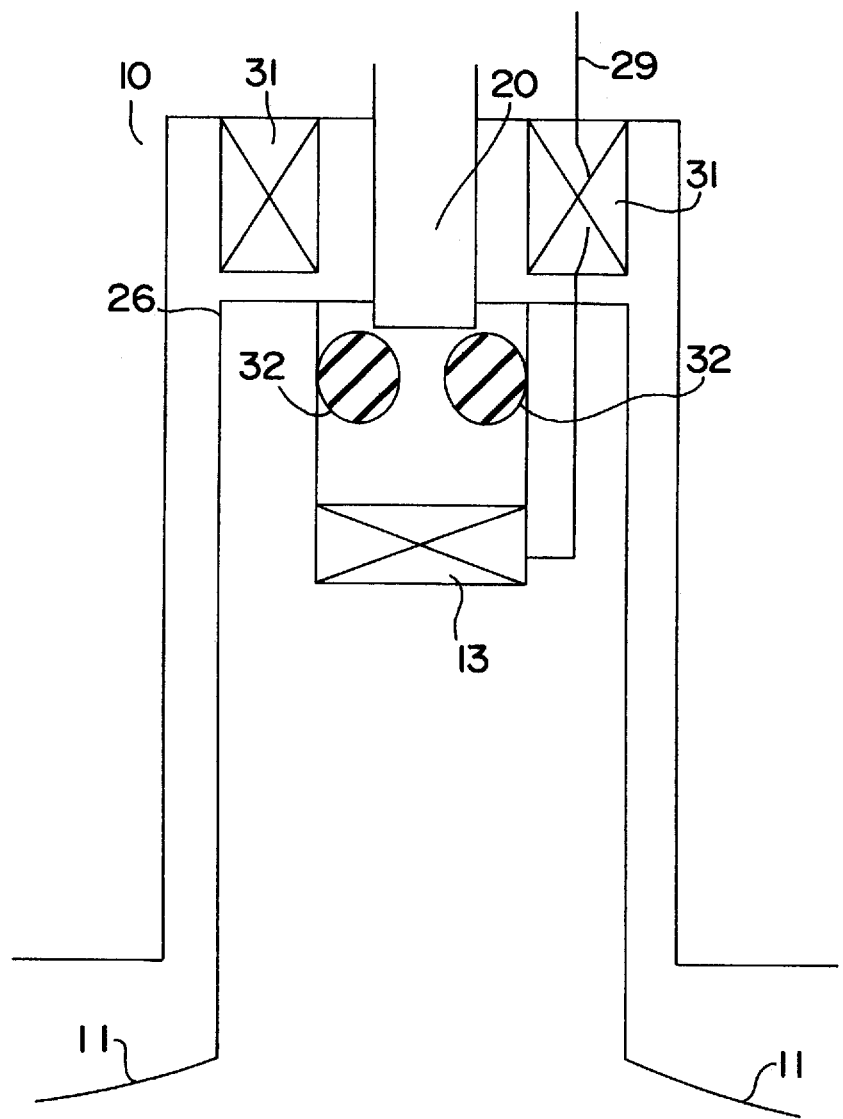
FIG. 8 is a longitudinal sectional view showing a state in which a bag enclosing liquified $CO_2$ is about to be separated from an unmanned submersible working boat of FIG. 7.
Figure 9:
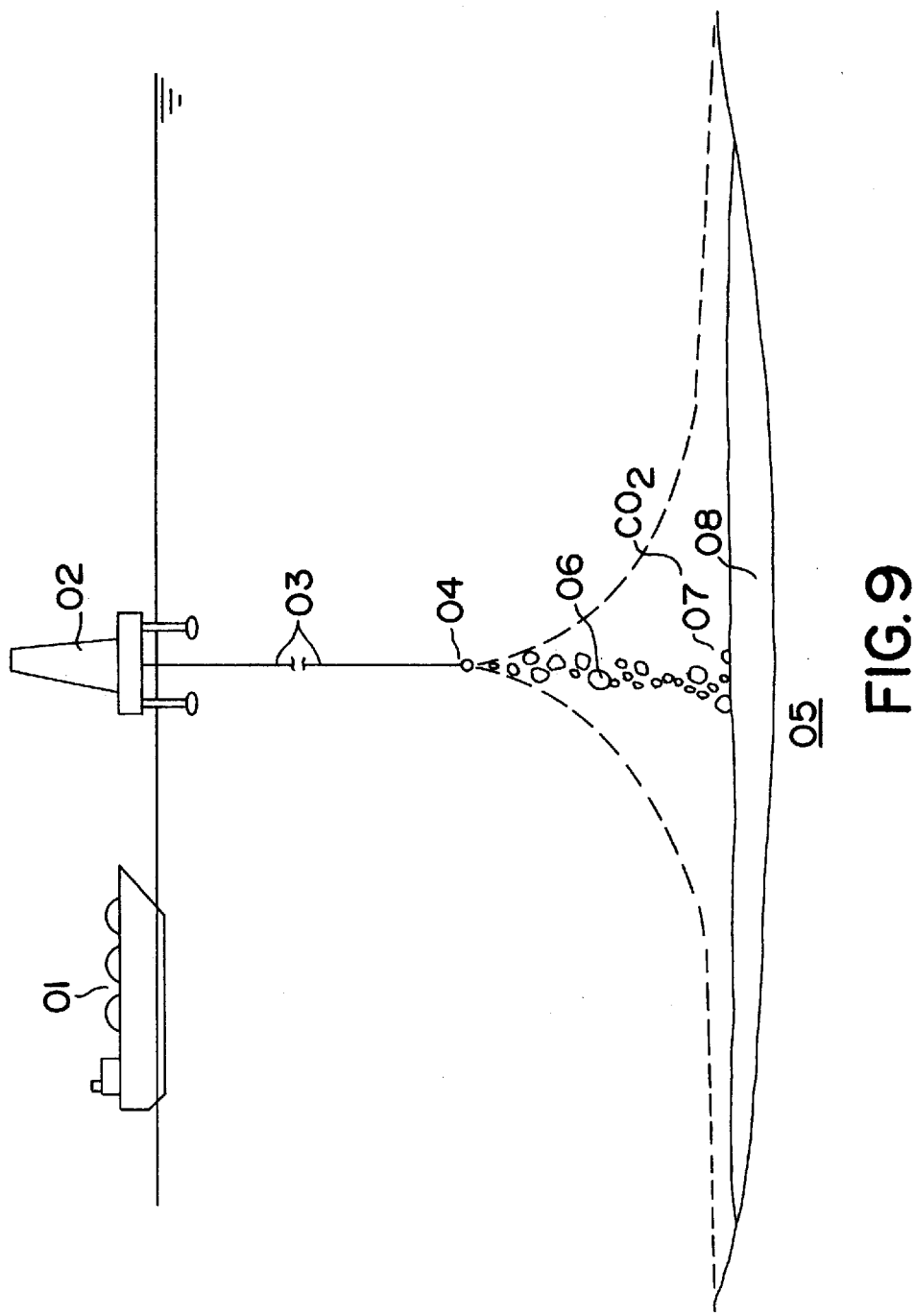
FIG. 9 is a conceptual drawing showing an entire CO deep sea throw-away system as previously contemplated.

The state immediately after the enclosing bag 11 has been filled with a predetermined amount of the liquified $CO_2$ and separated, together with the capsule 26, from the submersible working boat 10 is shown in FIG. 8. Once the submersible working boat 10 has discharged all the bags 11 mounted thereon, all filled with the liquified $CO_2$, it closes the extreme end valve 19 of the throwing pipe outlet 4 (FIG. 1) and returns to the submersible working boat control base 9.

Incidentally, as shown in FIG. 1, there are a plurality of branches of the throwing pipe outlet 4 (two branches in this preferred embodiment), and when a submersible working boat 10 leaves one branch, another submersible working boat 10 is connected to another branch. The extreme end valves 19 of the two branches are switched at the same time so that the liquified $CO_2$ is filled into the bags 11 continuously.

The submersible working boat 10 that has returned to the control base 9 has new capsules 26 mounted thereon, and returns to connect to the throwing pipe outlet 4 before the other submersible working boat 10 discharges all of its capsules 26. Thus, the liquified $CO_2$ enclosed in the bags 11, settles in the sea and is stored on the deep sea bottom 5.

According to the present invention the following effects are obtained:

(1) As the liquified $CO_2$ is thrown into the deep sea at a depth where the liquid phase state of the liquified $CO_2$ is held, the equipment cost is reduced in comparison with the case where the work is performed at a depth of less than 3500 meters.

(2) There is no unfavorable influence on the offshore ecosystem accompanying the settling of the liquified $CO_2$ into the deep sea.

(3) A large amount of $CO_2$, which is considered to cause global warming, can be steadily and permanently isolated from the atmospheric zone.

As the fitting work of filling the liquified $CO_2$ into the bags 11, at a depth where the liquid phase state of the liquified $CO_2$ can be maintained, is performed unmanned and by remote control from a control base, the safety of the work can be ensured.

Because the enclosing bag is made of a liquified $CO_2$ impervious material and causes no leakage of liquified $CO_2$ into the sea, there are no unfavorable influences on the offshore ecosystem.

While the principles of the present invention have been described above, it is intended that all matter contained in the above description and illustrated in the accompanying drawings shall be interpreted to be illustrative and not as a limitation on the scope of the invention.

What is claimed is:

1. A deep sea disposal system for disposing of $CO_2$, comprising:

an offshore base floating on the sea, said offshore base having a throwing pipe extending therefrom into the sea to a depth at which the water pressure is sufficient to maintain a liquid phase state of $CO_2$, said throwing pipe having a throwing pipe outlet located at said depth;

an unmanned submersible work boat having a plurality of capsules mounted thereon, each of said capsules being connectable with said throwing pipe outlet and including a liquified $CO_2$ enclosing bag contained therein; and an offshore control base for controlling said unmanned submersible work boat.

2. The deep sea disposal system as claimed in claim 1, wherein said boat comprises:

a containing portion containing said capsules;

an intake adapted to be connected to said throwing pipe outlet; and distribution piping connecting said intake to said capsules and to said bags.

3. The deep sea disposal system as claimed in claim 1, wherein said unmanned submersible work boat is connected to said control base by a communication cable and comprises:

a $CO_2$ intake adapted to be connected to said throwing pipe outlet;

propulsion devices for moving said boat in a vertical direction and in a horizontal direction; and distribution piping connecting said intake to said capsules which contain said bags.

4. The deep sea disposal system as claimed in claim 3, wherein each of said bags comprises a sheet material that is impervious to liquified $CO_2$ and a weight located at a lower portion of said bag.

5. The deep sea disposal system as claimed in claim 1, wherein each of said capsules has an open lower end which is covered with a breakable partitioning film for holding said bag in said capsule prior to filling said bag with liquified $CO_2$.

6. An unmanned submersible work boat for use with a deep sea disposal system for disposing of $CO_2$, the deep sea disposal system including an offshore base floating on the sea, the offshore base having a throwing pipe extending therefrom into the sea to a depth at which the water pressure is sufficient to maintain $CO_2$ in a liquid phase, the throwing pipe having a throwing pipe outlet located at that depth, and an offshore control base for controlling the unmanned submersible work boat, and said boat comprising:

an intake adapted to be connected to the throwing pipe outlet;

a plurality of capsules mounted on said boat, each of said capsules containing a bag for enclosing liquified $CO_2$;

propulsion devices for moving said boat in a vertical direction and in a horizontal direction;

a communication cable connected to said for boat for providing communication with the offshore control base; and distribution piping fluidly connecting said intake to said capsules and to an interior of each of said bags.

7. A capsule assembly for use with an unmanned work boat having distribution piping in the boat connecting a $CO_2$ intake to the capsule, said capsule comprising:

a cylindrical housing having an upper end and an open lower end;

a liquified $CO_2$ enclosing bag disposed within said cylindrical housing, said bag being formed of a sheet material which is impervious to liquified $CO_2$ and having an upper portion with an opening and a lower portion;

a bag separation device connecting said upper portion of said bag to said cylindrical housing;

a valve provided at said upper portion of said bag and adapted to open and close said opening; and a weight fitted at said lower portion of said bag.

8. The capsule assembly as claimed in claim 7, further comprising a breakable partitioning film covering said open lower end of said cylindrical housing.

9. A deep sea disposal system for disposing of $CO_2$, comprising:

an offshore base floating on the sea, said offshore base having a throwing pipe extending therefrom into the sea to a depth, at which the water pressure is sufficient to maintain a liquid phase state of $CO_2$, said throwing pipe having a throwing pipe outlet located at said depth; and an unmanned submersible work boat having a plurality of capsules that are connectable with said throwing pipe outlet mounted thereon, each of said capsules containing therein a liquified $CO_2$ enclosing bag.

10. The deep sea disposal system as claimed in claim 9, wherein said boat comprises:

a containing portion in said boat containing said capsules, an intake which is connectable to said throwing pipe outlet, and distribution piping connecting said intake to said capsules and to said bags.

* * * * *